Aug. 25, 1970 P. A. MARTIN 3,525,168

INTERCHANGEABLE DISK VIEWER TOY

Filed March 8, 1968 3 Sheets-Sheet 1

INVENTOR.
PAUL A. MARTIN
BY Cumpston, Shaw & Stephens
ATTORNEYS

INVENTOR.
PAUL A. MARTIN
BY Cumston, Shaw & Stephens
ATTORNEYS

Aug. 25, 1970 P. A. MARTIN 3,525,168

INTERCHANGEABLE DISK VIEWER TOY

Filed March 8, 1968 3 Sheets-Sheet 3

INVENTOR.
PAUL A. MARTIN

BY Cumpston, Shaw & Stephens

ATTORNEYS

United States Patent Office
3,525,168
Patented Aug. 25, 1970

3,525,168
INTERCHANGEABLE DISK VIEWER TOY
Paul A. Martin, East Aurora, N.Y., assignor to Fisher-Price Toys, Inc., East Aurora, N.Y., a corporation of New York
Filed Mar. 8, 1968, Ser. No. 711,761
Int. Cl. G09f *11/04*
U.S. Cl. 40—71 16 Claims

ABSTRACT OF THE DISCLOSURE

A camera viewer toy has a viewing aperture, a slot for receiving one of a number of disks having concentric, transparent scenes for viewing in the aperture, and a mechanism for advancing the disks in stepped rotation. The advancement mechanism includes a drive member engaging a disk in its hub area with the drive member and the disk having overridable and mutually mating surfaces. A spring biases the drive member into engagement with the disk and also engages notches for indexing the drive member.

This invention relates to an interchangeable disk viewer toy.

The objects of the invention include, without limitation, the following:

(a) A viewer toy in which transparency disks can be interchanged and advanced in stepped rotation for viewing;

(b) A viewer disk advancement mechanism that is simple, reliable, rugged, and able to accommodate interchangeable disks;

(c) A toy that offers a wide variety of play activity to a child and is entertaining, educational, and pleasing; and (d) A toy that is rugged, durable, safe, and easily operated by a child.

These and other objects of the invention will be apparent hereinafter from the specification which describes the invention, its use, operation, and preferred embodiments, from the drawings, which constitute a part of the disclosure, and from the subject matter claimed.

Generally, the inventive toy includes: a number of disks having concentric, viewable transparencies, a body having a viewing aperture and a slot for receiving any one of the disks for viewing; a drive member disposed for engaging the hub area of a disk in the slot, with the drive member and the disk having over-ridable and mutually mating surfaces; means for biasing the drive member and the disk together; and means for advancing the drive member to turn the disk in stepped rotation. Preferably, the drive member has index notches engaged by a bias spring urging the drive member into engagement with a disk. Also, the mating portions of the mutually mating surfaces preferably equal to the number of scenes on the disk, and the index notches equal the same number. Preferably, the drive member includes a ratchet having teeth equalling the number of scenes on the disk, and a pawl is arranged for advancing the drive member one tooth at a time.

Figure 1:
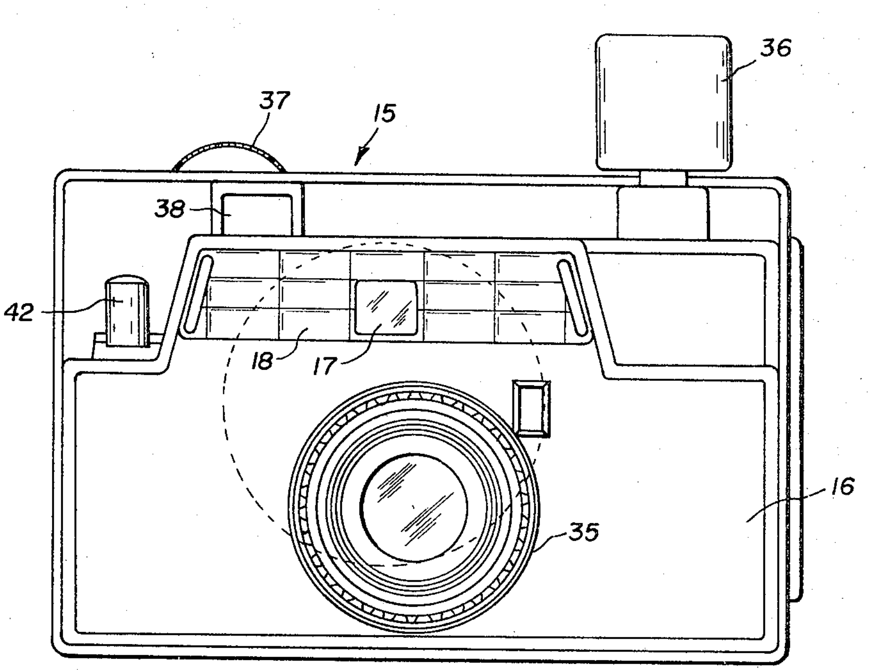
FIG. 1 is a front elevation of a preferred embodiment of the inventive toy.

The illustrated toy 15 has a body 16 shaped to simulate a camera and includes a viewing aperture having a front window 17 formed in a panel 18 simulating a light meter window and including an eye piece 19 and a lens 20. A slot 25 is formed in body 16 to receive any one of a number of disks 30 having concentrically arranged, transparent, viewable scenes 31. Body 16 also includes a simulated lens housing 35, a simulated flash cube 36, and a filter disk 37 intersecting a filter viewing aperture 38 for disposing different colored filters in aperture 38. In addition, body 16 includes a storage compartment 40 for storing disks 30, and a door 41 arranged to snap closed over compartment 40.

Figure 2:
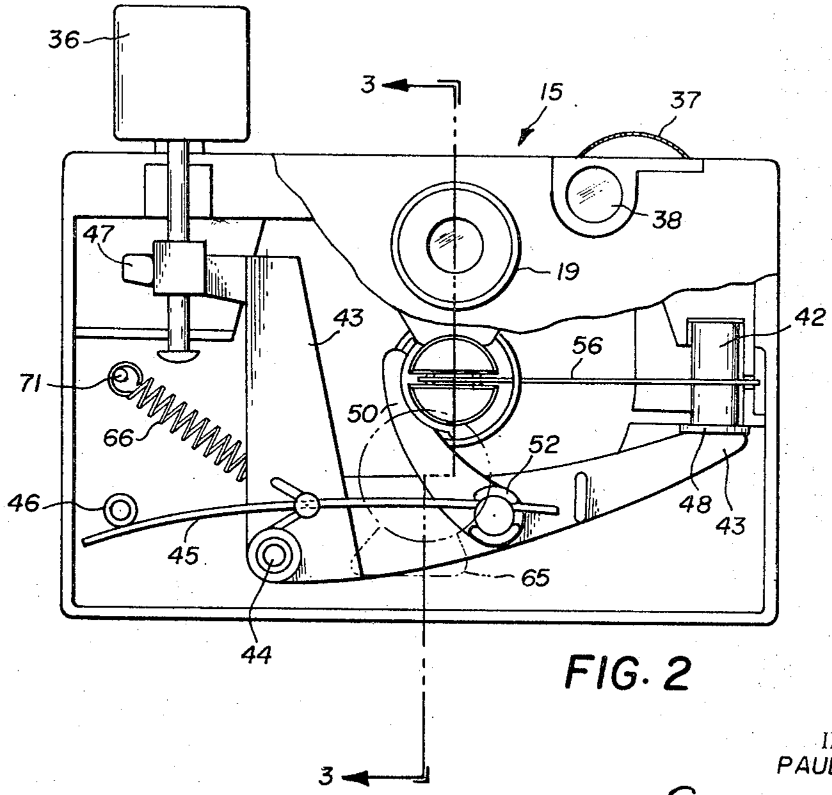
FIG. 2 is a partially cut-away rear elevation of the toy of FIG. 1.

Body 16 includes a mechanism for advancing a disk 30 in stepped rotation in slot 25. An actuator plunger 42 is pushed down to move lever 43 which is pivoted on journal 44 and biased to the position illustrated in FIG. 2 by a spring 45 that rests against stud 46 and extends through openings in lever 43 as illustrated. One free end 47 of lever 43 operates to advance flash cube 36 one quarter turn for each operation of plunger 42. The other end of lever 43 supports pawl 50 which engages the teeth 51 of disk drive member 55. Disk drive member 55 preferably has the same number of teeth 51 as the number of scenes 31 on disk 30 so that a single tooth advancement of disk drive member 55 corresponds with a single scene advancement of disk 30. Since disks 30 for the illustrated toy have eight scenes 31, disk drive member 55 has eight teeth as illustrated.

Figures 3, 4, 6, 7:
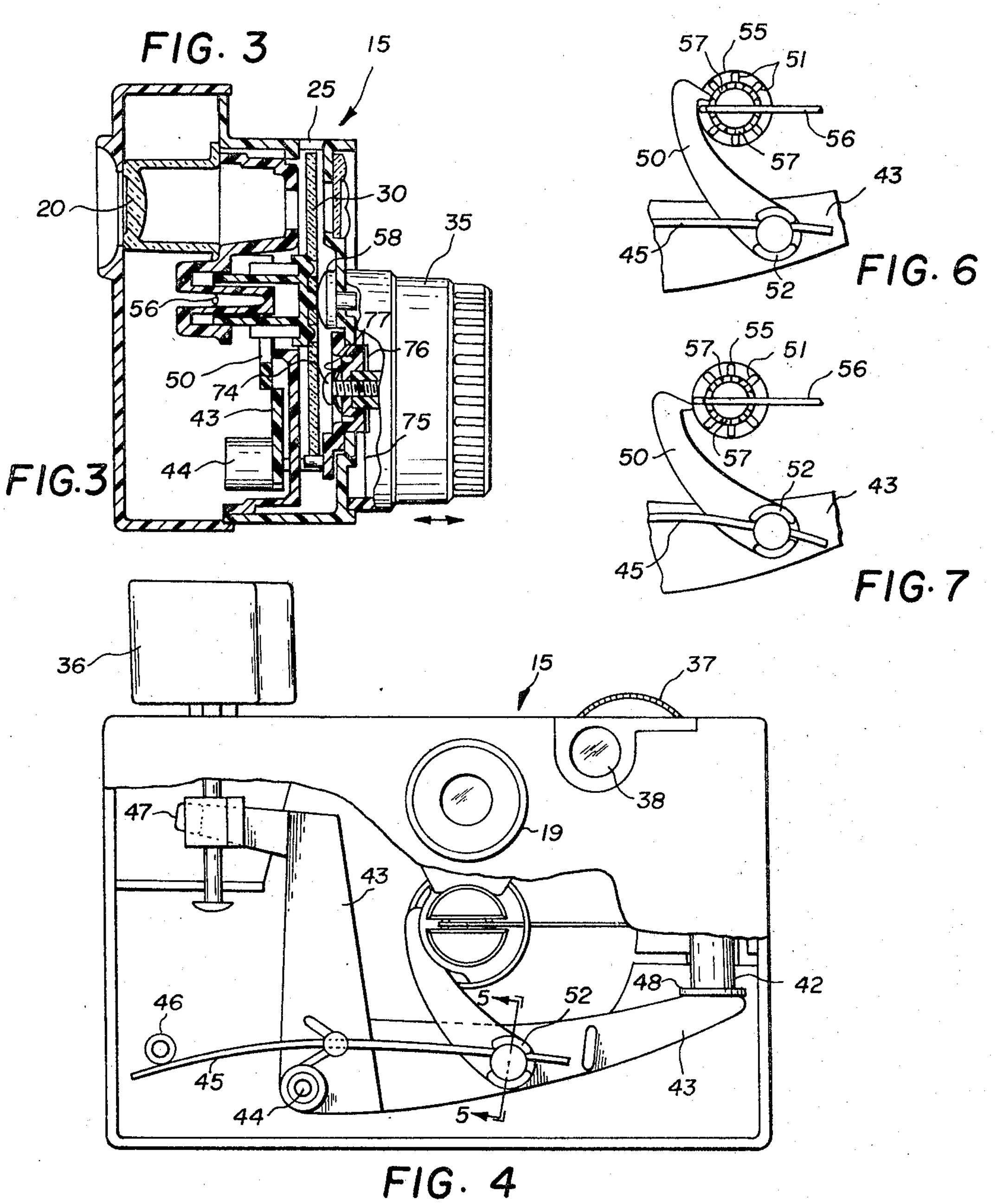
FIG. 3 is a side elevation of the toy of FIG. 2 partially cut-away along the line 3—3 thereof.
FIG. 4 is a partially cut-away rear elevation of the toy of FIG. 1.
FIGS. 6 and 7 are fragmentary rear elevational views of a pawl and ratchet drive for the toy of FIG. 1.
Figure 5:
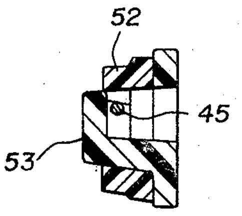
FIG. 5 is a partial cross section of the toy of FIG. 4 taken along the line 5—5 thereof.

Bias spring 45 supports and biases pawl 50 as best shown in FIGS. 5–7. The hub 52 of pawl 50 is split as illustrated and fitted over slotted stud 53 on lever 43. A free end of spring 45 is inserted through the slot in stud 53 and between the halves of hub 52 to secure pawl 50 on lever 43 and also bias pawl 50 into engagement with ratchet teeth 51. When pawl 50 rides over a tooth 51 of disk drive member 55 as best shown in FIG. 7, it turns counter-clockwise from its normal position illustrated in FIG. 6, and this forces the upper portion of hub 52 down against spring 45 to depress spring 45 as shown in FIG. 7. When pawl 50 clears teeth 51, the pressure of spring 45 against hub 52 returns pawl 50 to its normal position shown in FIG. 6. Spring 45 also biases lever 43 upward against plunger 42, and flange 48 on the bottom of plunger 42 limits such upward motion. In operation, each downward thrust of plunger 42 moves lever 43 clockwise so that pawl 50 draws a tooth 51 of disk drive member 55 downward, and on the return stroke of lever 43 and plunger 42, pawl 50 rides over the next tooth 51 of disk drive member 55 to return to a position for a succeeding advancement.

Disk drive member 55 is detented in each advancement position by spring 56 engaging notches 57 on the back of disk drive member 55. Since each disk 30 has eight scenes 31, eight notches 57 are provided on the back of disk drive member 55 to afford eight detent positions corresponding with proper positioning of a scene 31 in the viewing aperture. As disk drive member 55 is advanced by pawl 50, spring 56 rides from one pair of notches 57 to a succeeding pair of notches 57 to index disk drive member 55 in the next advanced position and hold disk drive member 55 in place while pawl 50 returns over a tooth 51 for a succeeding advancement.

Spring 56 also biases disk drive member 55 forward into engagement with a disk 30 in slot 25 and allows disk drive member 55 to be forced rearwardly as a disk 30 is inserted or removed from slot 25. As best shown in FIG. 3, a friction button 58 is disposed forward of disk 30 to engage the hub of disk 30 and support disk 30 against the bias of spring 56. Button 58 is preferably convex as illustrated and formed of a synthetic resin different from the resin of disk 30 to provide a low co-efficient of friction in engagement with disk 30.

Figures 8, 9, 10, 11, 12:
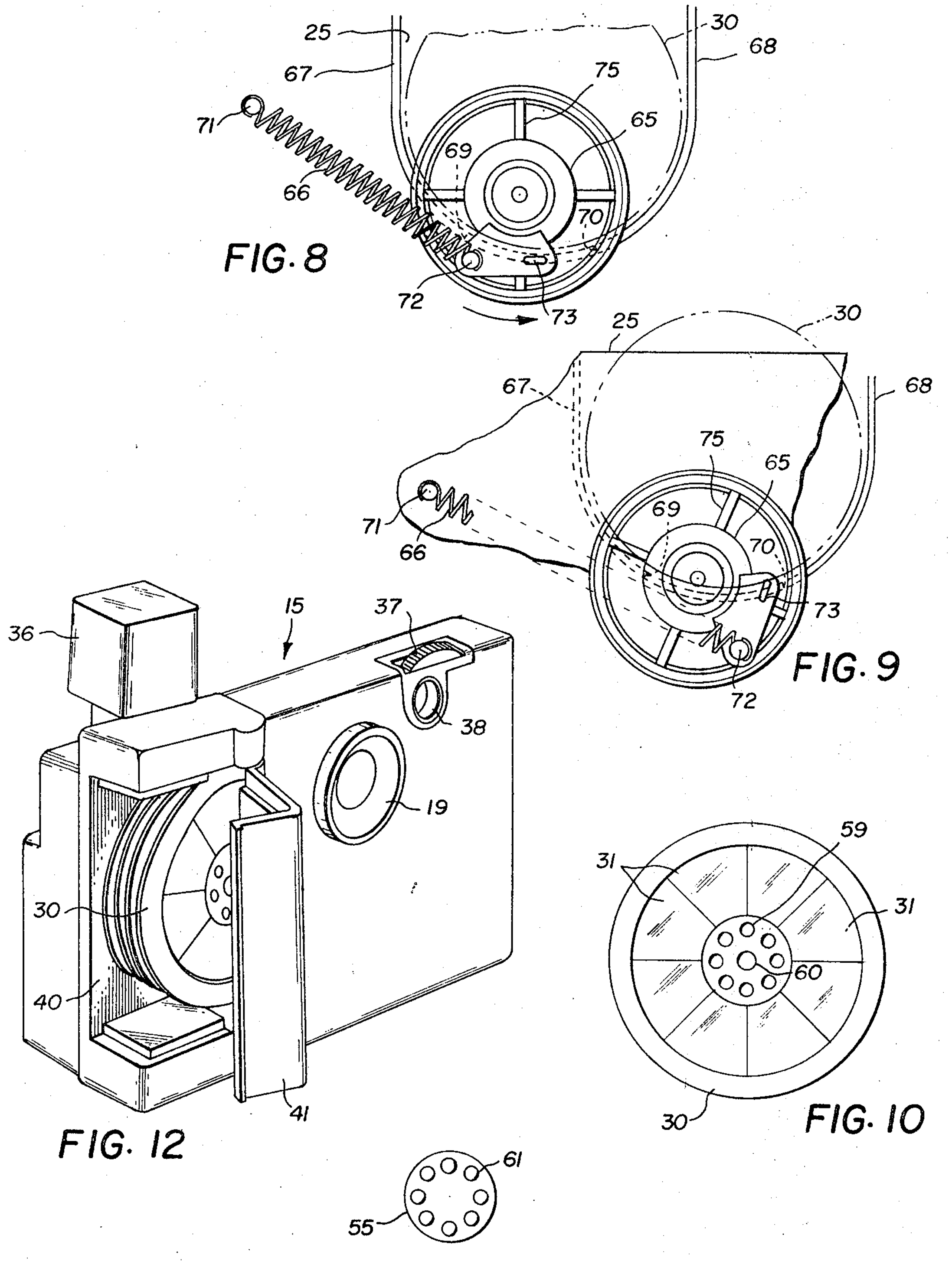
FIGS. 8 and 9 are fragmentary rear elevational views of a disk ejector for the toy of FIG. 1.
FIG. 10 is an elevational view of a disk for use in the inventive toy.
FIG. 11 is a front elevation of the disk engaging face of a disk drive member for the toy of FIG. 1.
FIG. 12 is a perspective view of the rear of the toy of FIG. 1.

The engagement between disk drive member 55 and disk 30 is preferably an over-ridable and mutually mating coupling as best shown in FIGS. 3, 10, and 11. A ring of apertures 59 is formed concentrically around hub aperture 60 of disk 30, and apertures 59 are equal in number to scenes 31 so that one aperture 59 corresponds to each scene 31. The forward face of disk drive member 55 is formed with a concentric ring of convex projections 61 arranged to seat in apertures 59 when disk 30 is disposed for viewing in slot 25. The rounded, convex shape of projections 61 allows them to ride out of apertures 59 if sufficient turning force is applied to disk 31. This prevents any manual turning of disk 30 to be reflected back through the drive mechanism to damage parts of the toy. As disk 30 is inserted into slot 25, it forces disk drive member 55 rearwardly until projections 61 drop into apertures 59 for proper engagement of disk 30 for advancement.

The toy also includes a disk ejector 65 best shown in FIGS. 3, 8, and 9. Ejector 65 is mounted concentrically with lens housing 35 for rotation inside body 16, and spring 66 biases ejector 65 clockwise toward a normally assumed position as illustrated in FIG. 8. Peripheral walls 67 and 68 of slot 25 terminate near the bottom of slot 25 to provide an opening allowing movement of ejector 65. The lower termination 69 of wall 67 provides a stop limiting the clockwise motion of ejector 65, and the end 70 of wall 68 provides a stop limiting the counter-clockwise motion of ejector 65. Spring 66 extends between stud 71 on body 16 and stud 72 on ejector 65. An ejecting lug 73 extends from ejector 65 into the bottom of slot 25 for engaging and lifting a disk 30 upward from slot 25.

In the normally assumed position of ejector 65 as shown in FIG. 8, ejector lug 73 is below the bottom of a disk 30 disposed for viewing in slot 25. When ejector 65 is turned counter-clockwise to the position illustrated in FIG. 9, ejector lug 73 rises to engage and lift disk 30 upward from slot 25. This allows the upper rim of disk 30 to be gripped above body 16 for removing disk 30 from slot 25.

The turning of ejector 65 is accomplished through lens housing 35. Lens housing 35 is pivotally mounted on the front of body 16 and supported by nail 74. The forward face of ejector 65 is formed with notches 76, and the rear face of lens housing 35 is formed with cross vanes 75 that seat in notches 76 for turning ejector 65. A spring 77 in the form of a convex washer is arranged on nail 74 to urge the head of nail 74 rearward to hold vanes 75 in engagement with notches 76. As lens housing 35 is turned, vanes 75 turn ejector 65 to the limit position illustarted in FIG. 9. If lens housing 35 is further turned, vanes 75 over-ride or slip over notches 76 by compressing spring 77. This effect also produces entertaining clicking noises. When lens housing 35 is released, it returns with ejector 65 to the normal position of ejector 65 under the bias of spring 66.

In operation, door 41 is opened at the back of toy 15, and a disk 30 is selected and removed for viewing. Disk 30 is pushed downward into slot 25, and this displaces disk drive member 55 rearwardly until disk 30 reaches a bottom position in which projections 61 engage apertures 59, and hub aperture 60 is centered against friction button 58. In such position, disk 30 is properly disposed so that scenes 31 can be viewed through eye piece 19, and once projections 61 are seated in apertures 59, disk 30 is properly indexed with a scene 31 centered for viewing. Index spring 56 accomplishes such indexing through its engagement with notches 57 on the back of disk drive member 55, and the position of notches 57, projections 61, apertures 59, and scenes 31 are inter-related so that spring 56 insures the accurate indexing of each scene 31 in the viewing aperture through eye piece 19.

When disk 30 is properly seated in slot 25, its upper edge is just inside the toy body 16 as shown in FIG. 3. This discourages tampering with disk 30 while it is connected with the disk drive mechanism, but if a child succeeds in rotating disk 30 in such position, the over-ride coupling between disk apertures 59 and projections 61 on disk drive member 55 prevents any turning or forcing of the advancement mechanism.

Disk 30 in slot 25 is advanced in stepped rotation by depressing plunger 42 which rocks lever 43 and actuates pawl 50 for advancing a tooth 51 of the ratchet on disk drive member 55. This moves disk drive member 55 and disk 30 a step at a time as controlled and indexed by spring 56.

To remove disk 30 from slot 25, lens housing 35 is rotated to turn ejector 65 so that lug 73 engages and lifts disk 30 above slot 35. Disk 30 is then pulled from slot 25 and can be replaced by another disk.

Other over-ridable, mutually engaging surfaces can be arranged between disk drive member 55 and disk 30. For example, corresponding radial ridges and grooves can be used. Preferably the mating portions of any such surfaces equal the number of scenes on disk 30 so that in any mating relationship between disk 30 and disk drive member 55, a scene 31 will be accurately disposed for viewing. Other index means can be arranged for detenting the advancement of disk 30 to insure successive registration of scenes 31 in the viewing aperture. Also, other ejector arrangements can be used for lifting a disk from the viewing slot, or the viewing slot can be made shallow enough so that a fully inserted disk extends sufficiently to be gripped and removed from the seat. Furthermore, many embodiments of advancing mechanisms, spring bias arrangements, disk drives, and couplings can be made within the spirit of the invention.

It will thus be seen that the invention accomplishes its objects in providing a rugged, reliable and entertaining toy. Other features, advantages, and other specific embodiments of this invention will be apparent to those exercising ordinary skill in the pertinent art after considering the foregoing disclosure. In this regard, while a specific preferred embodiment has been described in detail, such disclosure is intended as illustrative, rather than limiting, and other embodiments, variations, and modifications can be effected within the spirit and scope of the invention as disclosed and claimed. Furthermore, the following claimed subject matter is intended to cover fully all the aspects of the disclosed invention that are unobvious over prior art, including all equivalent embodiments.

I claim:

1. An interchangeable disk viewer toy comprising:

(a) a plurality of disks each having a plurality of concentrically arranged, transparent viewable scenes;

(b) a body having a viewing apertures;

(c) said body being formed with a slot for receiving any selected one of said disks for viewing in said aperture;

(d) a disk drive member rotatably disposed in the region of said slot;

(e) a radial face of said disk drive member and the central area of each of said disks being formed with over-ridable and mutually mating surfaces disposed to engage when said selected disk is positioned in said slot for viewing;

(f) means for biasing said disk drive member and said selected disk together in said over-ridable engagement;

(g) means for advancing said disk drive member in stepped rotation to bring successive ones of said scenes into said aperture for viewing;

(h) said disk drive member having a radial surface opposite said mating face provided with index notches; and (i) said bias means comprises a spring engaging said index notches and urging said disk drive member toward said selected disk.

2. The toy of claim 1 wherein said index notches are equal in number to the number of said scenes on said disks.

3. The toy of claim 1 wherein said disk drive member includes ratchet teeth equal in number to the number of said scenes on said disks, and wherein a lever-actuated pawl is disposed for engaging said ratchet teeth to advance said disk drive member in said stepped rotation.

4. The toy of claim 3 wherein said mutually mating surfaces are formed with mating portions equal in number to the number of said scenes on said disks.

5. The toy of claim 4 wherein each of said disks is formed with concentric apertures in its central region equal in number to the number of said scenes on said disk, and said disk drive member is formed with an equal number of concentric, convex projections arranged to extend into said apertures.

6. An interchangeable disk viewer toy comprising:

(a) a plurality of disks each having a plurality of concentrically arranged, transparent viewable scenes;

(b) a body having a viewing aperture;

(c) said body being formed with a slot for receiving any selected one of said disks for viewing in said aperture;

(d) a disk drive member rotatably disposed in the region of said slot;

(e) a radial face of said disk drive member and the central area of each of said disks being formed with over-ridable and mutually mating surfaces disposed to engage when said selected disk is positioned in said slot for viewing;

(f) means for biasing said disk drive member and said selected disk together in said over-ridable engagement;

(g) means for advancing said disk drive member in stepped rotation to bring successive ones of said scenes into said aperture for viewing;

(h) a disk ejector;

(i) a spring biasing said ejector to normal disposition at the bottom of said slot; and (j) means for moving said ejector to engage and raise said selected disk from the bottom of said slot.

7. The toy of claim 6 wherein said ejector and said ejector moving means are formed with over-ridable and mutually mating surfaces, and including means for biasing said ejector and said ejector moving means together.

8. The toy of claim 7 having a body configured to simulate a camera and including a simulated lens housing, and wherein said ejector moving means comprises a rearward facing surface of said lens housing.

9. The toy of claim 8 wherein: said disk drive member includes ratchet teeth equal in number to the number of said scenes on said disks; a lever-actuated pawl is disposed for engaging said ratchet teeth to advance said disk drive member in said stepped rotation; said disk drive member has a radial surface opposite said mating face provided with index notches equal in number to the number of said scenes on said disks; said bias means comprises a spring engaging said index notches and urging said disk drive member toward said selected disk; and said mutually mating surfaces are formed with mating portions equal in number to the number of said scenes on said disks.

10. The toy of claim 9 wherein each of said disks is formed with concentric apertures in its central region equal in number to the number of said scenes on said disk, and said disk drive memmber is formed with an equal number of concentric, convex projections arranged to extend into said apertures.

11. The toy of claim 10 wherein: a convex bearing is arranged in the region of said slot opposite said drive member to engage the center of said selected disk disposed in said slot for viewing; said bearing is formed of a synthetic resin material different from the material of said disks; a compartment is formed for storage of said disks; and a cover is arranged for closing said compartment.

12. An interchangeable disk viewer toy comprising:

(a) a plurality of disks each having a plurality of concentrically arranged, transparent viewable scenes;

(b) a body having a viewing aperture;

(c) said body being formed with a slot for receiving any selected one of said disks for viewing in said aperture;

(d) a disk drive member rotatably disposed in the region of said slot;

(e) a radial face of said disk drive member and the central area of each of said disks being formed with over-ridable and mutually mating surfaces disposed to engage when said selected disk is positioned in said slot for viewing;

(f) said disk drive member being axially movable toward and away from said slot;

(g) means for biasing said disk drive member and said selected disk together in said over-ridable engagement;

(h) said mutually mating surfaces having a plurality of mating positions equal in number to the number of said scenes on said disks;

(i) said mutually mating surfaces being configured so that rotation of said disk relative to said disk drive member moves said disk drive member axially out of and into successive ones of said mating positions; and (j) means for advancing said disk drive member in stepped rotation to bring successive ones of said scenes into said aperture for viewing.

13. The toy of claim 12 wherein said mutually mating surfaces comprise: concentric apertures formed in the central region of said disk equal in number to the number of said scenes on said disk, and an equal number of concentric, convex projections arranged on said disk drive member to extend into said apertures.

14. The toy of claim 12 including a fixed, convex bearing arranged in the region of said slot opposite said disk drive member to engage the center of said selected disk disposed in said slot for viewing.

15. The toy of claim 14 wherein said bearing is formed of a synthetic resin material different from the material of said disks.

16. The toy of claim 12 including a compartment for storage of said disks, and a cover for closing said compartment.

References Cited

UNITED STATES PATENTS

| | | | |
|---|---|---|---|
| 2,467,014 | 4/1949 | Dilks | 40—71 |
| 2,570,913 | 10/1951 | Brown. | |
| 3,090,158 | 5/1963 | Dixon | 46—228 |
| 3,297,249 | 1/1967 | Light | 40—70 X |

WILLIAM H. GRIEB, Primary Examiner